United States Patent
Schuler et al.

(10) Patent No.: US 12,130,777 B2
(45) Date of Patent: *Oct. 29, 2024

(54) SYSTEMS AND METHODS FOR PERFORMANT DATA MATCHING

(71) Applicant: Collibra Belgium BV, Brussels (BE)

(72) Inventors: Curtiss W. Schuler, Glendale, AZ (US); Brett A. Norris, North Vancouver (CA); Satyender Goel, Chicago, IL (US)

(73) Assignee: Collibra Belgium BV, Brussels (BE)

( * ) Notice: Subject to any disclaimer, the term of this patent is extended or adjusted under 35 U.S.C. 154(b) by 0 days.

This patent is subject to a terminal disclaimer.

(21) Appl. No.: 18/334,965

(22) Filed: Jun. 14, 2023

(65) Prior Publication Data

US 2023/0325351 A1    Oct. 12, 2023

Related U.S. Application Data

(63) Continuation of application No. 17/369,798, filed on Jul. 7, 2021, now Pat. No. 11,693,821.

(51) Int. Cl.
 G06F 16/14 (2019.01)
 G06F 16/13 (2019.01)

(52) U.S. Cl.
 CPC .......... G06F 16/152 (2019.01); G06F 16/137 (2019.01)

(58) Field of Classification Search
 CPC ................. G06F 16/152; G06F 16/137; G06F 16/90335
 See application file for complete search history.

(56) References Cited

U.S. PATENT DOCUMENTS

| | | | |
|---|---|---|---|
| 6,216,133 B1 * | 4/2001 | Masthoff | G06F 16/34 707/E17.093 |
| 8,387,877 B2 | 3/2013 | Shomo | |
| 10,503,755 B2 * | 12/2019 | Anderson | G06F 16/3338 |
| 2007/0276844 A1 | 11/2007 | Segal et al. | |

(Continued)

FOREIGN PATENT DOCUMENTS

| CN | 110677252 A | 1/2020 |
|---|---|---|
| CN | 112970024 A | 6/2021 |

OTHER PUBLICATIONS

International Search Report and Written Opinion of the International Searching Authority for International Application No. PCT/EP2022/068949 dated Oct. 12, 2022, 13 pages.

*Primary Examiner* — Angelica Ruiz
(74) *Attorney, Agent, or Firm* — Perkins Coie LLP (57) ABSTRACT

The present disclosure is directed to systems and methods for performant data matching. Entities maintain large amounts of data and desire to reconcile duplicative records. One way to solve this problem is through data matching. However, standard data matching at the record level can be laborious and inefficient. To remedy these inefficiencies in data matching, the present disclosure describes a system where the token records are tokenized a second time into token sets based on the token records satisfying at least one token set rule. A token set rule may be based on the common presence of multiple tokens in a token record. If multiple token records have the required tokens from the set rule, then those token records can be hashed and rolled-up into the token set (i.e., tokenized a second time into the token set). The token set allows for more efficient data matching.

20 Claims, 8 Drawing Sheets

(56) References Cited

U.S. PATENT DOCUMENTS

| | | | |
|---|---|---|---|
| 2007/0300250 A1* | 12/2007 | Smith | H04N 21/458 |
| | | | 725/135 |
| 2012/0310781 A1 | 12/2012 | Battle et al. | |
| 2013/0124474 A1 | 5/2013 | Anderson | |
| 2015/0073929 A1 | 3/2015 | Psota et al. | |
| 2015/0371702 A1 | 12/2015 | Wu et al. | |
| 2017/0236127 A1 | 8/2017 | Tahir | |
| 2019/0266197 A1 | 8/2019 | Ciabarra, Jr. et al. | |
| 2021/0397591 A1* | 12/2021 | Camper | G06F 16/215 |
| 2023/0014556 A1 | 1/2023 | Schuler et al. | |

* cited by examiner

600 — Match Comparisons

|  | S1 | S2 | SN |
|---|---|---|---|
| R1T1 | R2T1<br>R3T1<br>R4T1<br>-<br>-<br>RNT1 | R1T1<br>R3T1<br>-<br>-<br>RNT1 | R1T1<br>R2T1<br>R3T1<br>-<br>-<br>RNT1 |
| R1T2 | R2T2<br>R3T2<br>R4T2<br>-<br>-<br>RNT2 | | |
| R1TN | R2TN<br>R3TN<br>R4TN<br>-<br>-<br>RNTN | | |

604 — Match Pairs

| T1 | S1R1<br>S1R2<br>S3RX<br>-<br>-<br>SNRN |
|---|---|
| T2 | S1R1<br>S1R2<br>S3RX<br>-<br>-<br>SNRN |
| TN | S1R1<br>S1R2<br>S3RX<br>-<br>-<br>SNRN |

606 — SET rule

| Rule 1 | T1+T2+T4 |
|---|---|
| Rule 2 | T3+T5+TX |
| Rule 3 | T2+TX+TY |

Match Results

| E1 | (S1R1, S1R2, S2R1 ...) |

Simple Weighting

608 — Match SET

| SET Token (SeT) | |
|---|---|
| SeT1 | T(T1+T2+T4) |
| SeT1 | T(T1+T2+T4) |
| SeT2 | T(T3+T5+TX) |
| SeTN | T(T2+TX+TY) |

Hashing roll-up

610 — Match Results

| E1 | SeT1R1<br>SeT1R2<br>SeT1RX<br>-<br>-<br>SeT1RN |
|---|---|
| E2 | SeT2R1<br>SeT2R2<br>SeT2RX<br>-<br>-<br>SeT2RN |
| EN | SeTNR1<br>SeTNR2<br>SeTNRX<br>-<br>-<br>SeTNRN |

SYSTEMS AND METHODS FOR PERFORMANT DATA MATCHING

CROSS-REFERENCE TO RELATED APPLICATION(S)

This application is a continuation of U.S. patent application Ser. No. 17/369,798, filed Jul. 7, 2021, entitled "SYSTEMS AND METHODS FOR PERFORMANT DATA MATCHING," which is related to U.S. patent application Ser. No. 16/776,293 titled "SYSTEMS AND METHOD OF CONTEXTUAL DATA MASKING FOR PRIVATE AND SECURE DATA LINKAGE"; U.S. patent application Ser. No. 17/103,751, titled "SYSTEMS AND METHODS FOR UNIVERSAL REFERENCE SOURCE CREATION AND ACCURATE SECURE MATCHING"; U.S. patent application Ser. No. 17/103,720, titled "SYSTEMS AND METHODS FOR DATA ENRICHMENT"; and U.S. patent application Ser. No. 17/219,340, titled "SYSTEMS AND METHODS FOR AN ON-DEMAND, SECURE, AND PREDICTIVE VALUE-ADDED DATA MARKETPLACE," which are hereby incorporated by reference in their entirety.

TECHNICAL FIELD

The present disclosure relates to data matching techniques.

BACKGROUND

Entities maintain large amounts of data that may be disorganized and/or incomplete. For example, an entity may maintain more than one incomplete record related to a subject, such as an individual, product, organization, etc. One record may contain a subject's address, email, gender, and geographic location, while the other record may contain a subject's name, address, phone number, date-of-birth, and credit card information. Each of these records may be incomplete. Similar incomplete records may exist for products and organizations. Currently, entities desiring to reconcile these disjointed records typically must manually combine these records, which results in inefficient and time-consuming processes, as well as potential exposure to personally identifiable information.

Linking, de-duplicating, or finding matches between data assets remains one of the biggest problems of most organizations due to the breadth of data sources. Multi-channel data collection and in-house replication for serving the need of customers and business stakeholders poses challenges of reconciliation. Other problems like incompleteness, data entry mistakes, and changes over time, make it difficult for establishing a master (i.e., a "golden") record of data.

Another issue that entities face is ensuring data integrity of the records they may possess. For example, an entity may have two incomplete records seemingly associated with the same data subject. However, one record may list a different email address or phone number than the other. Such data discrepancies decrease the integrity of data records and make it more difficult for an entity to reconcile multiple, incomplete data records because the entity may be unsure which record is actually correct. Furthermore, an entity may be unsure to what extent a certain record may be correct. Modern day enterprises are hampered when it comes to accurate data collection and reconciliation.

Further, data matching and data linkage are computationally expensive when applied to data subjects with multiple features, characteristics, and attributes, such as people. The underlying complexity of data matching with these data subjects is multiplied due to the required processing of permutations to achieve a higher accuracy of match results.

As such, there is an increased need for systems and methods that can address the challenges of modern-day data collection and reconciliation, including the inefficiency of matching multiple incomplete records to the same data subject, the loss of integrity when records are inconsistent, and the potential exposure of personally identifiable information (PII), sensitive business information, and/or any form of confidential information, when such attempts to match and reconcile data records are made. There is an increased need for tokenization of attributes and sets of attributes to increase the efficiency of data matching.

It is with respect to these and other general considerations that the aspects disclosed herein have been made. Also, although relatively specific problems may be discussed, it should be understood that the examples should not be limited to solving the specific problems identified in the background or elsewhere in the disclosure.

BRIEF DESCRIPTION OF THE DRAWINGS

Non-limiting and non-exhaustive examples are described with reference to the following figures.

DETAILED DESCRIPTION

Various aspects of the disclosure are described more fully below with reference to the accompanying drawings, which form a part hereof, and which show specific exemplary aspects. However, different aspects of the disclosure may be implemented in many different forms and should not be construed as limited to the aspects set forth herein; rather, these aspects are provided so that this disclosure will be thorough and complete, and will fully convey the scope of the aspects to those skilled in the art. Aspects may be practiced as methods, systems, or devices. Accordingly, aspects may take the form of a hardware implementation, an entirely software implementation or an implementation combining software and hardware aspects. The following detailed description is, therefore, not to be taken in a limiting sense.

Embodiments of the present application are directed to enhanced data matching techniques, otherwise referred to as "performant data matching" throughout this disclosure. Data matching and data linkage is a computationally expensive process, especially when data matching is applied to data subjects with multiple features, characteristics, and attributes, such as humans. Tokenizing these data attributes at a record level is resource-intensive.

To address these drawbacks, the present application discloses a data matching process, whereby tokenized record pairs are subsequently tokenized into "entity tokens" or "token sets." By aggregating these related token record pairs into a single token set, data matching may be accelerated by orders of magnitude, allowing billions of data matching resolutions to happen in the fraction of time traditionally required for standard attribute-by-attribute data matching.

In some example aspects, performant data matching may occur in two steps. The first step is tokenization or "data masking," which is an example of one-way hashing. Data masking may refer to the hashing and/or encrypting client-specific information. Through this application, "client" may refer to the Customer and/or the Reference Source. In order for an entity to transmit sensitive data (e.g., PII) to a third-party (e.g., Consolidation Platform), the data usually should be tokenized. In some examples described here, client-specific information may be first hashed and encrypted and then uploaded to a secure server. The tokenized information may be retrieved from the secure server and analyzed. The tokenized client-specific information (i.e., "client tokens") may be tokenized using a combination of hash (one way compression function) and/or encrypted, wherein the hash code may include an additional computer-generated Secure Hash Algorithm (SHA2 512/256) salt. Other hashing and encryption methods may be used, including but not limited to, SHA2 348, SHA3, TripleDES, Twofish encryption algorithms, Blowfish encryption algorithms, Advanced Encryption Standard (AEs), IDEA encryption algorithm, MD5 encryption algorithms, and/or RSA security encryption algorithms. When the third-party server receives information transmitted from a Customer or Reference Source, the information is in the form of tokens. In other words, the raw data from the Customer and/or Reference Source (i.e., "client") is hashed and encrypted prior to being transmitted to the third-party secure server. The Consolidation Platform does not receive or process raw data.

In some example aspects, a first label included in a listing of anonymized labels that corresponds to a type of information in a tokenized attributed based on an identified classifier may be included. The label can provide an anonymized identifier of a type of information represented in the attribute. The label can be generated based on any of the attribute and the classifier. For example, if an attribute relates to a name, the corresponding label can be "La1." In these embodiments, only entities with access to a listing of the information corresponding to the labels can identify the type of information identified by each label, thereby anonymizing the data. To the third-party Consolidation Platform, the actual, unencrypted attribute or classifier may be unknown due to the tokenization of the data. For example, a certain attribute may refer to a data subject's address and have a label of "Address," but once labelized, this label may be token "La1" to the third-party Consolidation Platform. Further description of this process can be found in U.S. patent application Ser. No. 16/844,927, which is incorporated by reference in its entirety.

Data consolidating refers to consolidating two or more data records to create a single data record. For instance, a data record may include the data attributes of Name, DOB, Gender, and Email address. Another data record may include the data attributes of Name, Gender, Home address, and Phone number. If these two records are consolidated, then a single data record may be created that includes the data attributes of Name, DOB, Gender, Email address, Home address, and Phone number. Once consolidated, the consolidated data record may be known as a "composite."

A data composite may be useful to entities that may have multiple data records associated with a single data subject. For example, a bank may have a data record for a data subject's checking account and a data record for that same data subject's home loan. Both of these data records may include overlapping information, but one data record may include certain data attributes that the other data record does not include. As such, creating a composite of these data records may be beneficial to the entity, resulting in greater efficiency and higher levels of data integrity.

As described herein, an entity may utilize the systems and methods presented to match certain tokens using a reference token repository. For instance, a client may have two databases with two separate records associated with the same entity (e.g., person, place, product, thing, etc.). The client may submit these records to a data masking application that produces private and secure tokens for each of these records. These tokens may then be transmitted to a consolidation platform, where the tokens are analyzed for matching. The tokens may be compared to each other in some instances (i.e., A-B matching). In other instances, the tokens may be compared to a reference token repository to identify matching records (i.e., transitive matching). If the tokens match, then one of the tokens (i.e., a unique token) may be stored in the reference token repository for future use. Such a process of storing unique tokens ensures an efficient repository because no duplicate tokens will exist in the repository.

The systems and methods presented herein utilize Reference Sources to corroborate data records and fill in potential missing data attributes for a data record. A Reference Source is an entity that has data that is used as a reference point. For example, a Reference Source may be a "trusted" source, like a credit bureau, a bank, and/or a government entity. However, because "trust" is subjective, for purposes of this application, a Reference Source is any source that is used as a reference for comparison against another source (e.g., Customer source). For example, a Customer may have multiple data records for a data subject, but some data attributes may be missing. The Customer may hash and encrypt this data (i.e., transform the raw data into tokens) and then upload the tokens to a secure server where a third-party Consolidation Platform may access the Customer tokens. Additionally, a Reference Source may have complete and verified records (i.e., "trusted" records) that are hashed and encrypted (i.e., tokenized) and then uploaded to a secure server managed by the Consolidation Platform. The third-party Consolidation Platform may access the Reference Source tokens. The third-party Consolidation Platform may then identify overlapping and/or unique tokens in the Customer data (i.e., payload) by matching the Customer tokens to the Reference Source tokens located in a Reference Source Token Repository.

In some aspects, Customer tokens and Reference Source tokens may be received by the system. The Customer tokens and Reference Source tokens may be analyzed and compared. The results of the analysis and comparison may overlap in the Customer tokens and/or matching characteristics via comparison with a Reference Token Repository. Specifically, the third-party Consolidation Platform enables the identification of duplicate records and consolidation of data, but the actual consolidating of the data (e.g., merging two records associated with the same entity to create a single record) occurs in the Customer Environment.

The actual underpinnings of how data matching (e.g., between client sources, between a client source and a reference source, etc.) may occur is the focus of the present application. In one example, a token pair may be formed, wherein a token pair is defined as two tokens of the same type (e.g., type name, SSN, address, or any combination of attributes could be a "type"). Then, the token pair may be associated with a set rule, which may require a certain number of matched token pairs to qualify as a Record match/entity resolution. Once a set rule is established, then every token pair that may satisfy that rule is rolled up into a token set. The token set is then retokenized as a single token and used for comparison instead of individual comparison of each token pair in the rule set, to resolve entities and find matched records.

Accordingly, the present disclosure provides a plurality of technical benefits including but not limited to: enabling more efficient use of electronic resources for data matching, consolidating, and enabling data enrichment; providing more efficient storage management, since the matching, consolidating, and enrichment of a dataset may occur at a single third-party server; decreasing potential exposure of sensitive data, since all data transmitted to the third party servers is tokenized (i.e., hashed and encrypted); and decreasing manual overload of electronic devices, since the performant data matching, consolidating, and enrichment is configured to match token sets rather than individual tokens that may require much more computational resources.

Figure 1:
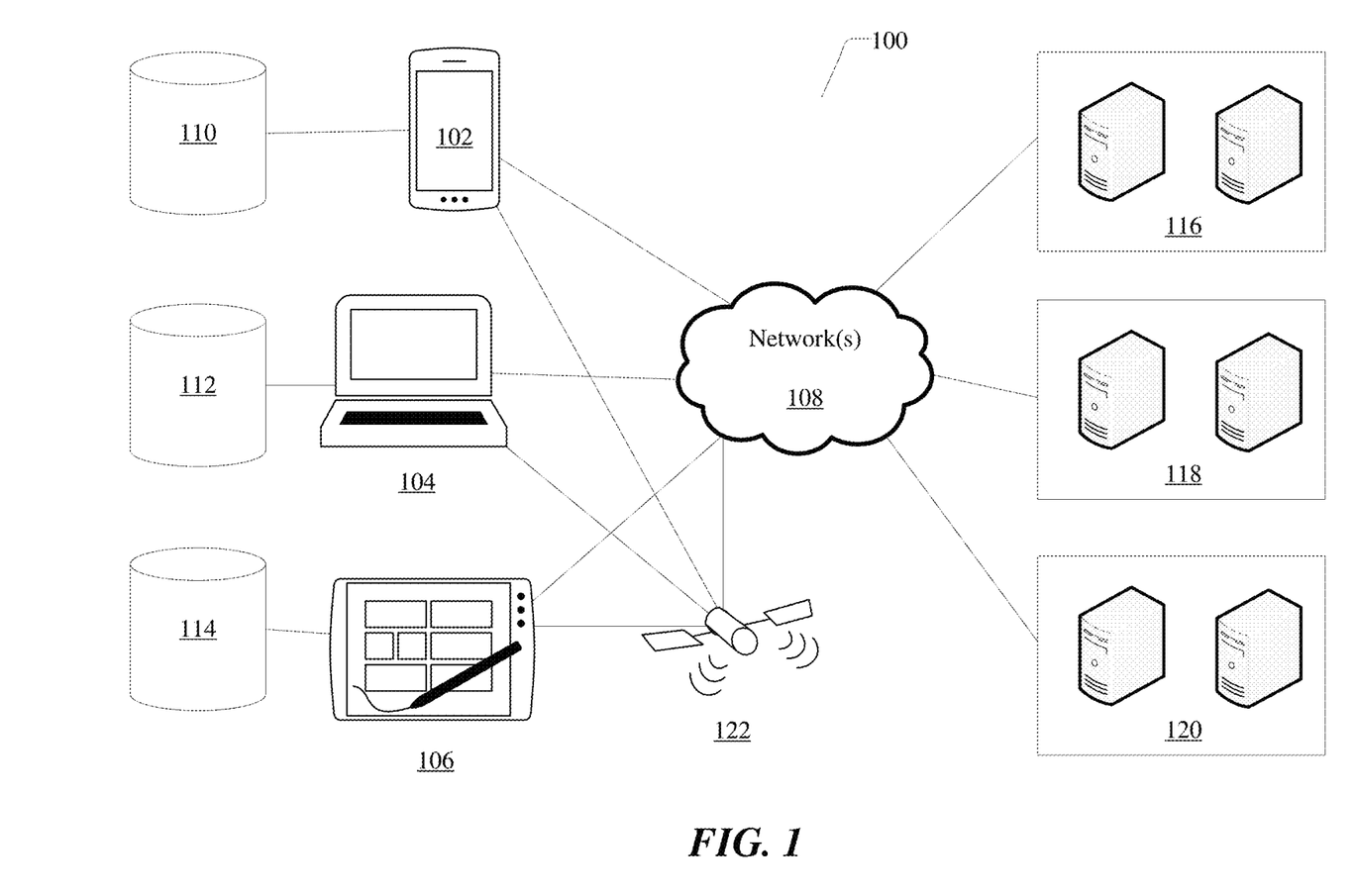
FIG. 1 illustrates an example of a distributed system for performant data matching, as described herein.

FIG. 1 illustrates an example of a distributed system for performant data matching, as described herein. Example system 100 presented is a combination of interdependent components that interact to form an integrated whole for consolidating and enriching data. Components of the systems may be hardware components or software implemented on, and/or executed by, hardware components of the systems. For example, system 100 comprises client devices 102, 104, and 106, local databases 110, 112, and 114, network(s) 108, and server devices 116, 118, and/or 120.

Client devices 102, 104, and 106 may be configured to receive and transmit data. For example, client devices 102, 104, and 106 may contain client-specific data. Client devices may download a third-party tokenization software program via network(s) 108 that may be applied to the client-specific data. The client-specific data may be stored in local databases 110, 112, and 114. Once tokenized, the client-specific data is transformed into "tokens," and these tokens may be transmitted via network(s) 108 and/or satellite 122 to server(s) 116, 118, and/or 120. Server(s) 116, 118, and/or 120 may be third-party servers owned by a Consolidation Platform. In other examples, client-specific data may be stored in servers (in addition to or instead of local client devices and local databases) and may be tokenized and then transmitted from client servers to third-party servers via network(s) 108 and/or satellite 122.

In aspects, a client device, such as client devices 102, 104, and 106, may have access to one or more datasets or data sources and/or databases comprising client-specific data. In other aspects, client devices 102, 104, and 106, may be equipped to receive broadband and/or satellite signals carrying client-specific tokens or unencrypted data (or a mixture of both). The signals and information that client devices 102, 104, and 106 may receive may be transmitted from satellite 122. Satellite 122 may also be configured to communicate with network(s) 108, in addition to being able to communicate directly with client devices 102, 104, and 106. In some examples, a client device may be a mobile phone, a laptop computer, a tablet, a smart home device, a desk phone, and a wearable (e.g., a smart watch), among other devices.

In some examples, the client devices 102, 104, and/or 106 may be configured to run performant data matching software on certain datasets. Specifically, the client device(s) 102, 104, and/or 106 may be configured to run a match preprocessor, which may partition files consisting of hashed, masked, and/or encrypted tokens. The partitioned files may be fed to a match processor, which may general intermediate files during the performant data matching process. The output of the match processor may be files suitable to be consumed by a database loading process. The database may be stored on local storage 110, 112, and/or 114, or remote storage device(s) !16, 118, and/or 120. The separate files may be loaded into a database loader and may persist the database-ready files across a database.

In some instances, local database(s) 110, 112, and/or 114, and remote data store(s) 116, 118, and/or 120 may be PostgreSQL (aka "postgres") databases, where multiple sources of data mat be stored. Cross-source matching may occur within the PostgreSQL database(s), and an entity merge processor may run recursive database functions to merge token entities with similar token attributes.

The procedure for tokenizing and transmitting data from the Customer-side and the Reference Source-side may be similar, in that the data may be stored locally initially and subsequently hashed and encrypted on the Customer-owned and/or Reference Source-owned client devices and, once in tokenized form, finally transmitted to third-party servers for analysis, consolidation, and enrichment, among other actions. In other words, FIG. 1 depicts a network topology that may be used in a Customer Environment and/or Reference Source Environment (i.e., client devices 102, 104, and/or 106 may belong to the Client Environment in one example and belong to the Reference Source Environment in another example).

Figure 2:
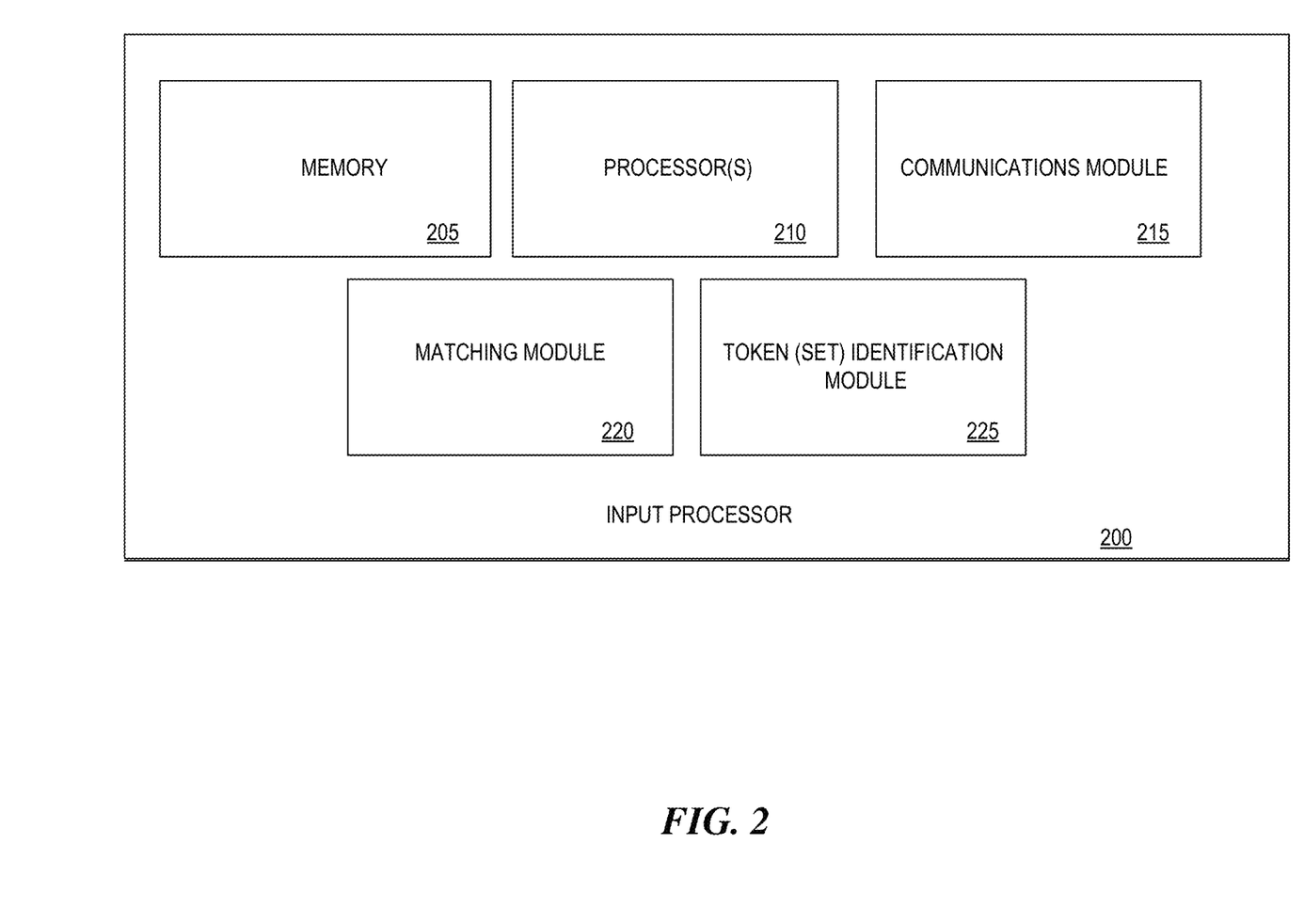
FIG. 2 illustrates an example input processor for implementing systems and methods for performant data matching, as described herein.

FIG. 2 illustrates an example input processor for implementing systems and methods for performant data matching, as described herein. Input processor 200 may be embedded within a client device (e.g., client devices 102, 104, and/or 106), remote web server device (e.g., devices 116, 118, and/or 120), and other devices capable of implementing systems and methods for performant data matching. The input processing system contains one or more data processors and is capable of executing algorithms, software routines, and/or instructions based on processing data provided by at least one client source and/or Reference Source. The input processing system can be a factory-fitted system or an add-on unit to a particular device. Furthermore, the input processing system can be a general-purpose computer or a dedicated, special-purpose computer. No limitations are imposed on the location of the input processing system relative to a client or remote web server device, etc. According to embodiments shown in FIG. 2, the disclosed system can include memory 205, one or more processors 210, communications module 215, matching module 220, and token (set) identification module 225. Token (set) identification module 225 may be configured to identify both tokens and token sets (aka "entity tokens"). Other embodiments of the present technology may include some, all, or none of these modules and components, along with other modules, applications, data, and/or components. Still yet, some embodiments may incorporate two or more of these modules and components into a single module and/or associate a portion of the functionality of one or more of these modules with a different module.

Memory 205 can store instructions for running one or more applications or modules on processor(s) 210. For example, memory 205 could be used in one or more embodiments to house all or some of the instructions needed to execute the functionality of matching module 220 and/or token (set) identification module 225, as well as communications module 215. Generally, memory 205 can include any device, mechanism, or populated data structure used for storing information. In accordance with some embodiments of the present disclosures, memory 205 can encompass, but is not limited to, any type of volatile memory, nonvolatile memory, and dynamic memory. For example, memory 205 can be random access memory, memory storage devices, optical memory devices, magnetic media, floppy disks, magnetic tapes, hard drives, SIMMs, SDRAM, RDRAM, DDR, RAM, SODIMMs, EPROMs, EEPROMs, compact discs, DVDs, and/or the like. In accordance with some embodiments, memory 205 may include one or more disk drives, flash drives, one or more databases, one or more tables, one or more files, local cache memories, processor cache memories, relational databases, flat databases, and/or the like. In addition, those of ordinary skill in the art will appreciate many additional devices and techniques for storing information that can be used as memory 205.

Communications module 215 is associated with sending/receiving information (e.g., matched by matching module 220, and/or identified by token (set) identification module 225), commands received via client devices or server devices, other client devices, remote web servers, etc. These communications can employ any suitable type of technology, such as Bluetooth, WiFi, WiMax, cellular (e.g., 5G), single hop communication, multi-hop communication, Dedicated Short Range Communications (DSRC), or a proprietary communication protocol. In some embodiments, communications module 215 sends information output by matching module 220 (e.g., matching tokens), and/or token (set) identification module 225 (e.g., identifying a unique token based on the match to store in a Universal Reference Token Repository) to client devices 102, 104, and/or 106, as well as memory 205 to be stored for future use. In some examples, communications modules may be constructed on the HTTP protocol through a secure REST server(s) using RESTful services.

Matching module 220 is configured to receive at least two sets of data, e.g., dataset A and dataset B. The module 220 may also receive and maintain at least one reference dataset (e.g., Reference Source dataset, universal reference set, etc.). Matching module 220 may be configured to compare dataset A and dataset B via matching algorithms, such as AB matching. Module 220 may further be configured to compare dataset A to the reference dataset and compare dataset B to the reference dataset. The comparison analysis may reveal that dataset A matches sufficiently to the reference dataset and that dataset B matches sufficiently to the reference dataset. If dataset A matches to the reference dataset and dataset B matches to the reference dataset, then dataset A matches to dataset B via the transitive property. Matching module 220 may also accept single data records and compare the data records to data records from the at least one dataset that is maintained by transitive matching module 220. Matching module 220 is also configured to execute the transitive matching analysis on tokens. In other words, at least two token sets may be compared against a Reference Source token set, and if token set A matches to the Reference token set and token set B matches to the Reference token set, then token set A matches token set B via the transitive property.

In yet other examples, matching module 220 may be configured to match data sets using the associative property, where token pairs are generated and then aggregated to form token sets. For example, different tokens may be associated with different underlying data attributes (that may be masked). The records of tokens may have overlapping tokens, so those records may be merged into a single token set once those records are compared with each other and identified as having matching token records. This token set may be used in future matching and processing functions, as opposed to using two distinct—yet similar and overlapping—records.

Token (Set) Identification module 225 may be configured to identify a single unique token record that is determined to be a match to another token based on the results of matching module 220, as well as configured to identify a group of tokens that may be rolled up (aggregated) into a token set that is determined to be a match to another token set based on the results of matching module 220. If a match is indicated from matching module 220, then a copy of the matched token (or token set) may be obtained by token (set) identification module 225 and stored in a reference token repository, such as a Universal Reference Token Repository. Token (set) identification module 225 may also be configured to identify already-stored tokens in a token repository. For instance, based on the results of matching module 220, a unique token may be identified but not stored in the Universal Reference Token Repository because the unique token already exists, and the Universal Reference Token Repository will not accept duplicate tokens or token sets.

Figure 3:
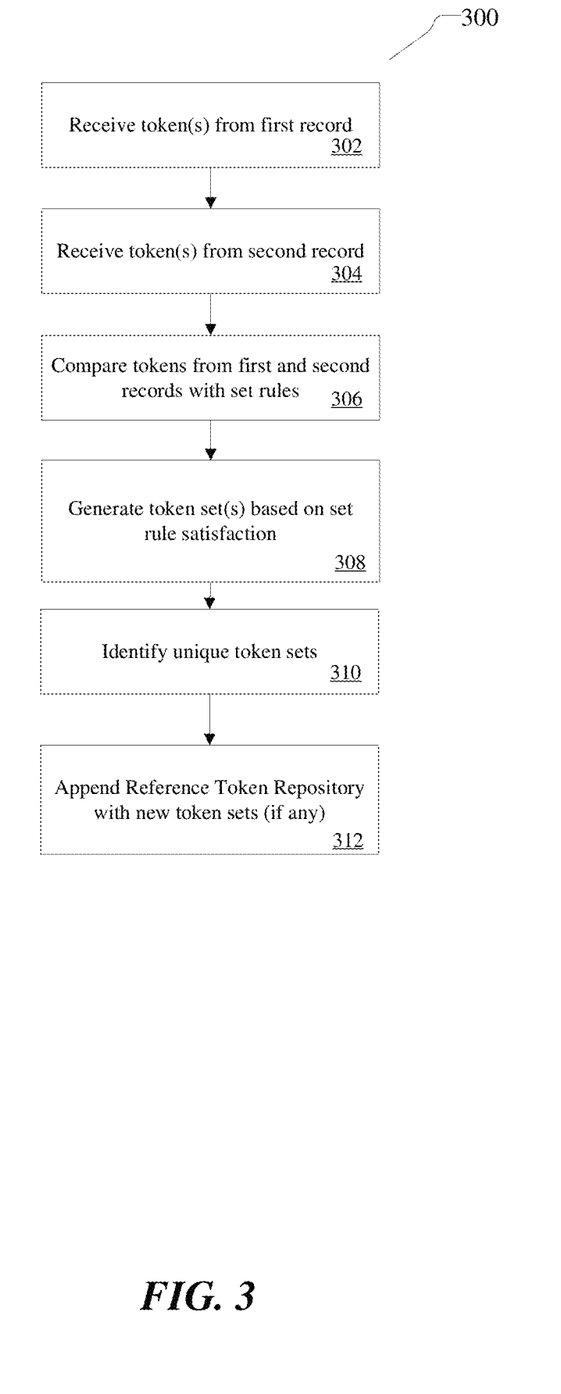
FIG. 3 illustrates an example method for matching token sets using performant data matching techniques.

FIG. 3 illustrates an example method for matching token sets using performant data matching techniques. Each token may be comprised of a single attribute or multiple attributes. For instance, a single token may refer to a group of three attributes (e.g., Name, DOB, Email), or in some example aspects, the token may refer to a part of a single attribute (e.g., last 4 digits of SSN). Tokens are not limited to one-to-one matching with attributes. Method 300 begins with steps 302 and 304, which is to receive tokens (or token sets) from a first source and a second source. For example, tokens may be received by a single client from two different databases (i.e., two different sources). The tokens may or may not be associated with the same entity.

Prior to the transmission of the tokens at steps 302 and 304, the Customer data may be tokenized at the Customer-side. Prior to receiving the Customer data, Customer client devices may have used a tokenization software program to hash and encrypt (or "mask") the raw Customer data prior to transmission, so what is actually transmitted to the Consolidation Platform are Customer "tokens." Once tokenized, the Customer tokens may be transmitted and received by the third-party Consolidation Platform at step 304. Note that receiving Customer tokens at step 304 and receiving Reference Source tokens may be implemented simultaneously or in vice versa order (with reception of the Reference Source tokens happening before the reception of the Customer tokens).

The Customer tokens may be received by the Consolidation Platform and stored on secured servers. After reception of the Customer tokens, the method proceeds to step 306, where the tokens may be compared to each other. This comparison may utilize a matching algorithm, such as A-B matching, deterministic matching, probabilistic matching, and/or a combination of matching algorithms. In other examples, the matching techniques may rely on a hybrid technique that uses probability of a match by weighting.

Each token record may be compared with other token records to determine if there are overlapping tokens in the token record. The overlapping tokens from each record (i.e., the "matched" tokens) may be compared to create match pairs, and finally resolved as matches against a library of "set rules." In another example process, a pre-determined set rule may determine whether certain matching tokens may trigger the consolidation (tokenization) of multiple tokens into a set token because the same, matching tokens exist in multiple records. As such, the system may determine that it is more efficient to consolidate these nearly duplicative token records into a single token set for more efficient matching and processing.

After the comparison step in 306, a token set may generate at step 308, which is the product of simple weighting and a hashed roll-up of multiple token records. For instance, a set rule may state that token records should be matched if the token records comprise tokens T1, T2, and T4. If Record 2 has tokens 1, 2, 3, and 4, but Record 3 only has tokens 1, 2, and 4, then token Records 2 and 3 may be matched according to the set rule because both records comprise tokens T1, T2, and T4. By virtue of matching using simple weighting, these token records have the same tokens for three token types (T1, T2, and T4). The rule says to consolidate these token records into a token set (e.g., S1R1=S2R2=S(T1, T2, T4)). Further description on this example is below with respect to FIG. 6.

Upon identifying that single tokens match, at least one set token (i.e., a consolidation of at least two Customer token records) may be indicated. A set token refers to the consolidation of multiple token records to create a single token record. In other instances, a set token may refer to multiple token sets aggregated together. For example, the Customer tokens may make up multiple token records associated with the same data subject (although, the third-party Consolidation Platform is unable to identify this data subject because the information is tokenized on the third-party Consolidation Platform). A composite of the data subject may be created by consolidating the multiple token records associated with that same data subject. The composite record, when transmitted back to the Customer and/or Reference Source environment and mapped via unique non-derived IDs in the Customer and/or Reference Source environment, the consolidated record would include all of the aforementioned data attributes: Name, DOB, Gender, physical address, email address, and age. The end result is a composite record, which is a single record associated with a certain data subject and/or entity. Such a composite record is created in the Customer Environment, so while the third-party Consolidation Platform may facilitate the identification of certain records to be consolidated and/or enriched, the actual consolidation and enrichment happens at the Customer Environment prior to transmission of the Customer tokens to the Consolidation Platform. As used herein, "data subject" may be a person, product, business, entity, etc. The systems and methods described herein are not limited to simply personal data related to human data subjects but can be applied to supply chain data, product data, business entity data, etc.

After the token sets are generated at step 308, unique token sets may be identified at step 310, where the generated token sets may be compared to preexisting tokens in a Reference Token Repository. If the tokens already exist, then the token may not be added to the Reference Token Repository to avoid duplication, but if a certain token set does not exist, then the new token may be appended to the Reference Token Repository at step 312.

Figure 4:
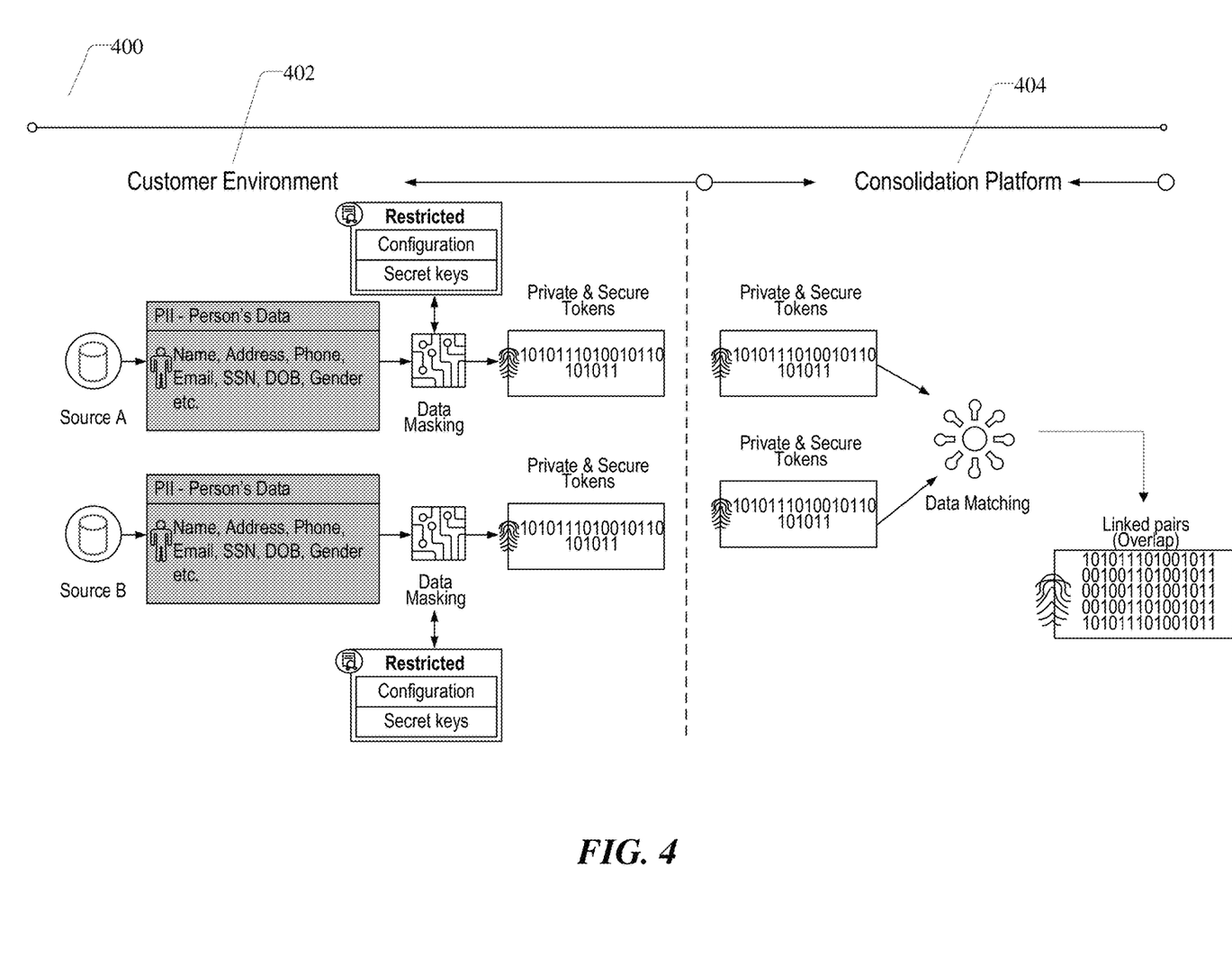
FIG. 4 illustrates an example of a distributed system that includes a Customer environment and a Consolidation Platform environment for performant data matching.

FIG. 4 illustrates an example of a distributed system that includes a Customer environment and a Consolidation Platform environment for performant data matching. The distributed system in FIG. 4 is an example data registry 400. The data registry 400 may be comprised of the Customer environment 402 and the Consolidation Platform 404. As shown in the Customer environment 402, data may be received from multiple Customer databases (e.g., databases Source A and/or Source B). The data may contain multiple data attributes associated with a data subject, such as Name, Address, Phone, Email, SSN, DOB, Gender, etc. The Customer data may be tokenized inside of the Client Environment 402. Once tokenized, the client tokens may be transmitted to the Consolidation Platform 404.

The Consolidation Platform 404 may receive the tokens from the Customer Environment 402 in the form of private and secure tokens. The Consolidation Platform 404 may receive the tokens from the Customer environment in the form of private and secure tokens. Within the Consolidation Platform 406, the tokens from the Customer may be compared, e.g., using A-B matching techniques. At the comparison step, linked pairs (i.e., "overlap") may be identified with tokens. In some examples, a record may also consist of a bit string (i.e., string of 1's and 0's). A "1" may indicate that a certain data attribute exists, whereas a "0" may indicate that the data attribute does not exist. When the tokens for a record are compared, if token or tokens of records have the same value then a linked pair is established based on an established threshold. If the bit values in a matched record pair are different, then at least one of the token records has the data attribute, whereas the other token record does not. If both token records have a "0" in the column, then that particular corresponding data attribute is missing. Specifically, a linked pair may be created by the customer tokens that are transmitted to the Consolidation Platform 404. The customer tokens may then be compared to at least one reference source token. The results of a match between the customer tokens and reference source tokens may prompt the customer to assign a new record ID to reflect the existence of a match.

Figure 5:
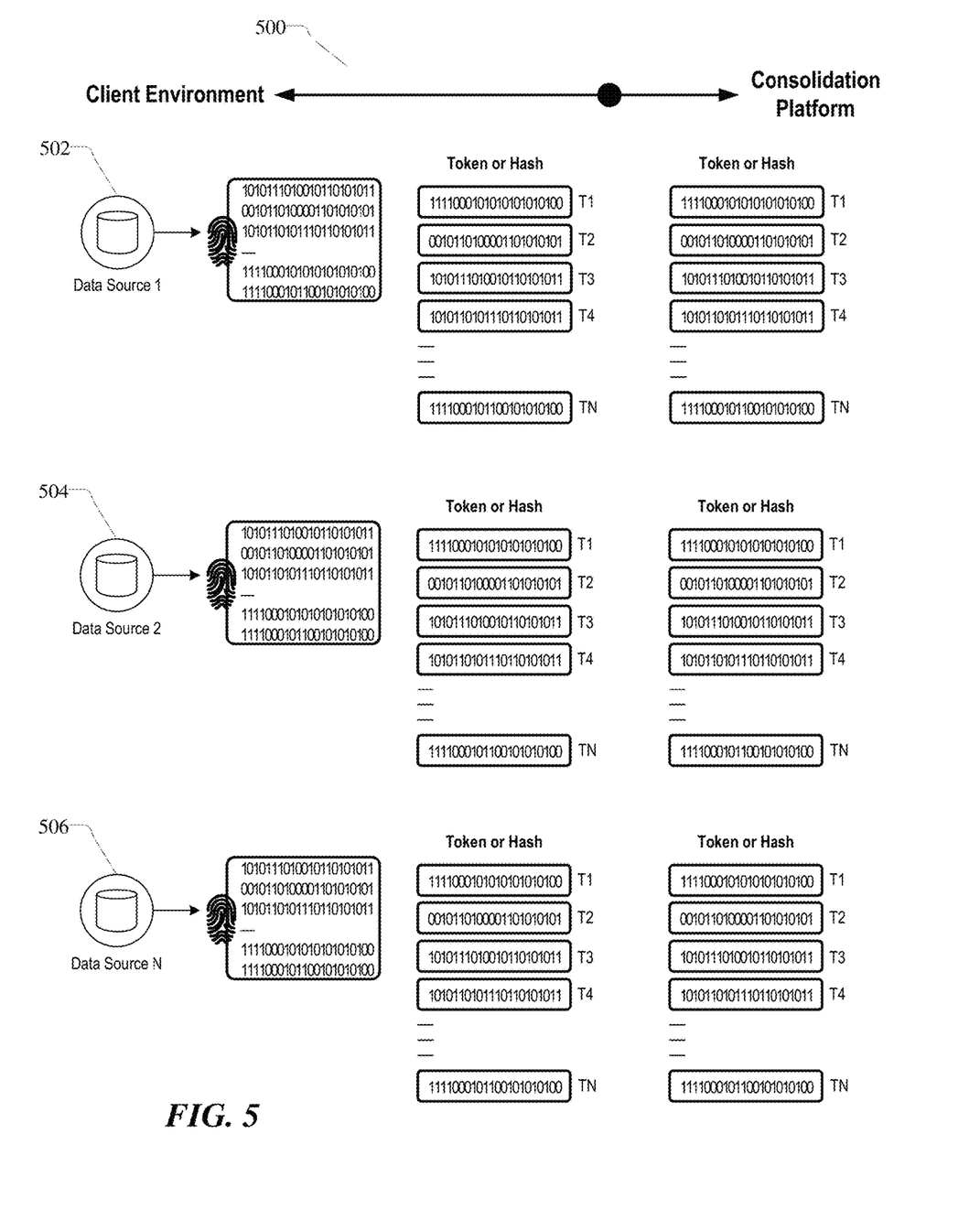
FIG. 5 illustrates example data sources and tokens.

FIG. 5 illustrates example data sources and tokens. Environment 500 shows data source(s) 502, 504, and 506. Data source(s) 502, 504, and 506 may all be owned by the same client or different clients. In one example, data source(s) 502, 504, and 506 may be owned by the same client (e.g., a bank) and be associated with different programs from that client (e.g., data source 502 may be residential home loan data, whereas data source 504 may be personal checking account data). Each of these data sources have tokens, which, as described previously, are tokenized (i.e., hashed/encrypted) data attributes, such as Name, DOB, address, SSN, Gender, Email, Phone, etc. Each token (e.g., T1, T2, T3, . . . Tn, etc.) may represent multiple data attributes, a single data attribute, or a partial data attribute, as explained previously. These tokens are then compared to each other, record-to-record, to determine if there is a match between tokens of source records, which may result in a token set (wherever the same token is found between records of sources).

Figure 6:
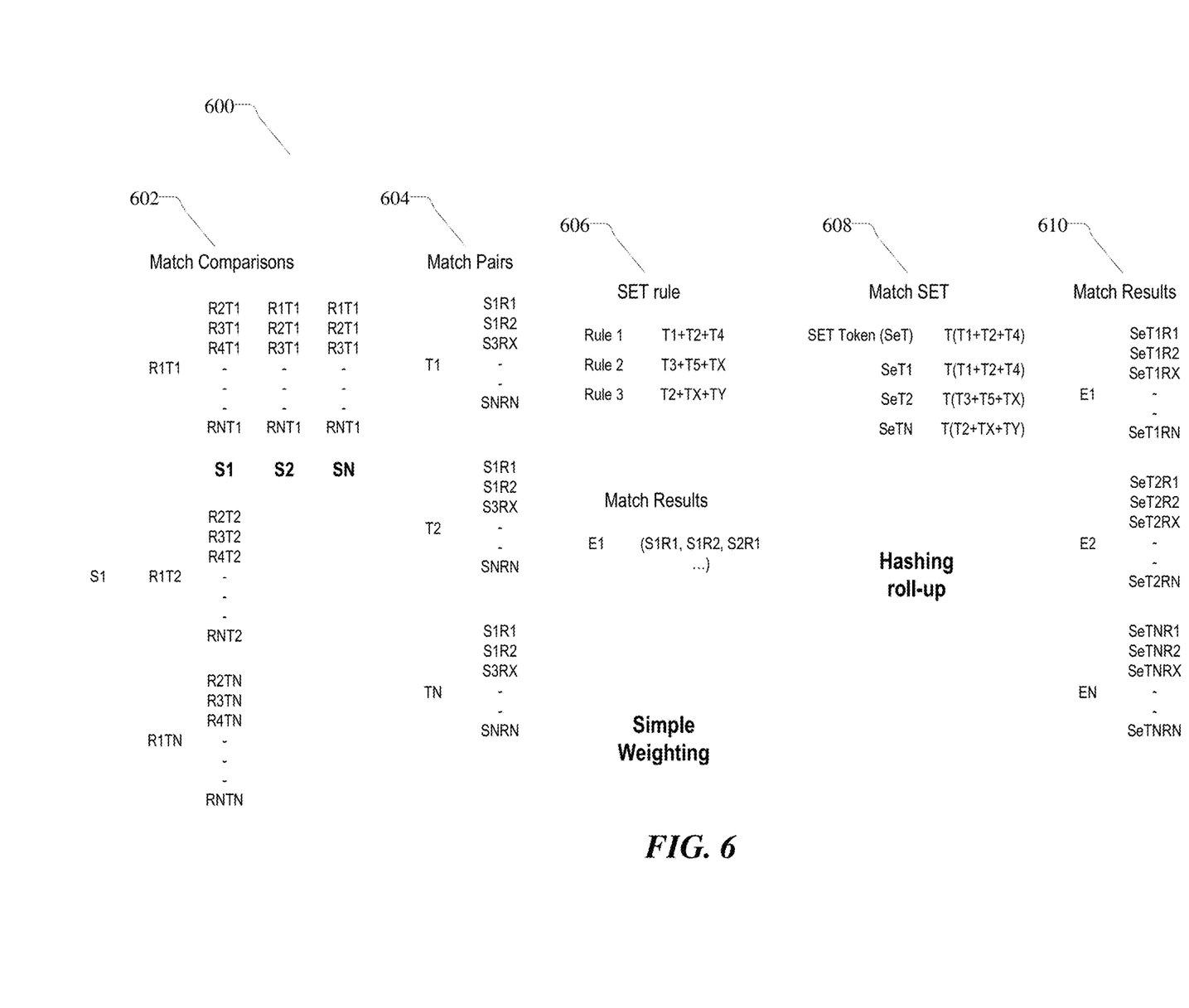
FIG. 6 illustrates an example of matching token pairs, establishing token set rules, and matching token sets.

FIG. 6 illustrates an example of matching token pairs vs matching set token pairs, establishing token set rules, and matching token sets. Environment 600 may comprise match comparisons 602, where tokens at the record level are compared to each other. For example, Record 1 Token 1 is compared to Record 2 Token 1. From the match comparison 602, match pairs 604 may be established. For example, a matched pair may result from Record 1 and Record 2 if both of these have token 1. These matched pairs are then compared to the set rules 606. Set Rules may be established to ensure a high-degree of matching accuracy. For instance, one set rule may be T1+T2+T4, which indicates that a token set may be generated if two records with each Token 1, Token 2, and Token 4 are matched to each other. Another rule may comprise T3+T5+T7, which indicates that a token set may be generated if the token records each have tokens 3, 5, and 7.

Once a group of token records are determined to satisfy a set rule 606 (i.e., Simple Weighting), then an entity can be called "resolved," or the records may be identified as matched (duplicates in case of the records from same source or overlaps in case of the records from different sources). In other instances, instead of comparing token by token and later checking for set rules to determine matches, tokens can be assembled by set rule for each record and retokenized as a single set token, SeT, (Hashing Roll-up) at 608. Hashing roll-up reduces the token pair comparison, e.g., three times according to the set rule (T1+T2+T4) in a first case of simple weighting to a single comparison for SeT1. Once a set is generated at 608, the set may be applied to future tokens that are ingested by the system. Thus, if a record is received that contains Token 1, Token 2, and Token 4, then that token record may be matched with the already-established token set S1(T1+T2+T4). In some cases, hashing roll-up can also be applied to duplicate detection in a similar manner to the aforementioned explanation of overlap detection.

To provide a discrete example, a set rule may be defined as such:

S1: T1+T2+T4

The tokens in the data set may be T1-T4, and T1-T4 may each be tokenized versions of underlying data attributes. T1-T4 may represent the following data attributes (although, note, the system is blind to the underlying data attributes because these data attributes are tokenized):

T1: Name+DOB+Email
T2: Name
T3: SSN+DOB
T4: License No.+CC No.

As tokens are received by the system (such as a third-party Consolidation Platform), the tokens may be matched with each other at the record level to create a token set:

| Source 1 (S1) | | | | | |
|---|---|---|---|---|---|
| R1: | T1 | T2 | T3 | | |
| R2: | T1 | T2 | T3 | T4 | T5 |
| R3: | T1 | T2 | | T4 | |
| Source 2 (S2) | | | | | |
| R1: | T1 | | T3 | | |
| R2: | T1 | T2 | | T4 | T5 |
| R3: | T1 | T2 | | T4 | T5 |
| Source 3 (S3) | | | | | |
| R1: | T1 | | T3 | | |
| R2: | | T2 | T3 | | T5 |
| R3: | T1 | T2 | | T4 | |

In the example above, the records that satisfy the Set Rule (T1+T2+T4) would include the following sets: duplicates—S1R2, S1R3, Overlap—S1R2, S1R3, S2R2, S2R3, S3R3. Each of these tokens would be associated with a single set rule: Rule1 (T1+T2+T4).

In other aspects, tokens can be rolled up into a Set Token by applying the predetermined rules based on the required source or reference source matching.

Rule1=$T1+T2+T4$

Set Token by Rule1($SeT1$)=$T_{(T1+T2+T4)}$

Source 1(S1)
SeT1
SeT2
SeTX
Source 2 (S2)
SeT2
SeTY
SeTZ
Source 3 (S3)
SeT1
SeT2
SeTW In above example the source records that meet the certain criteria of a set rule may be automatically rolled up into the token set (token of tokens), rather than compared individually at the record level to other tokens, thereby decreasing the time needed to create a probable combination of match pairs for the number of available Tokens for each record.

The Hashing roll-up process explained above may be applied for finding overlap between difference source records, and overlap between source and reference records, and may also be applied to finding duplicates for between records of the same source.

Figure 7:
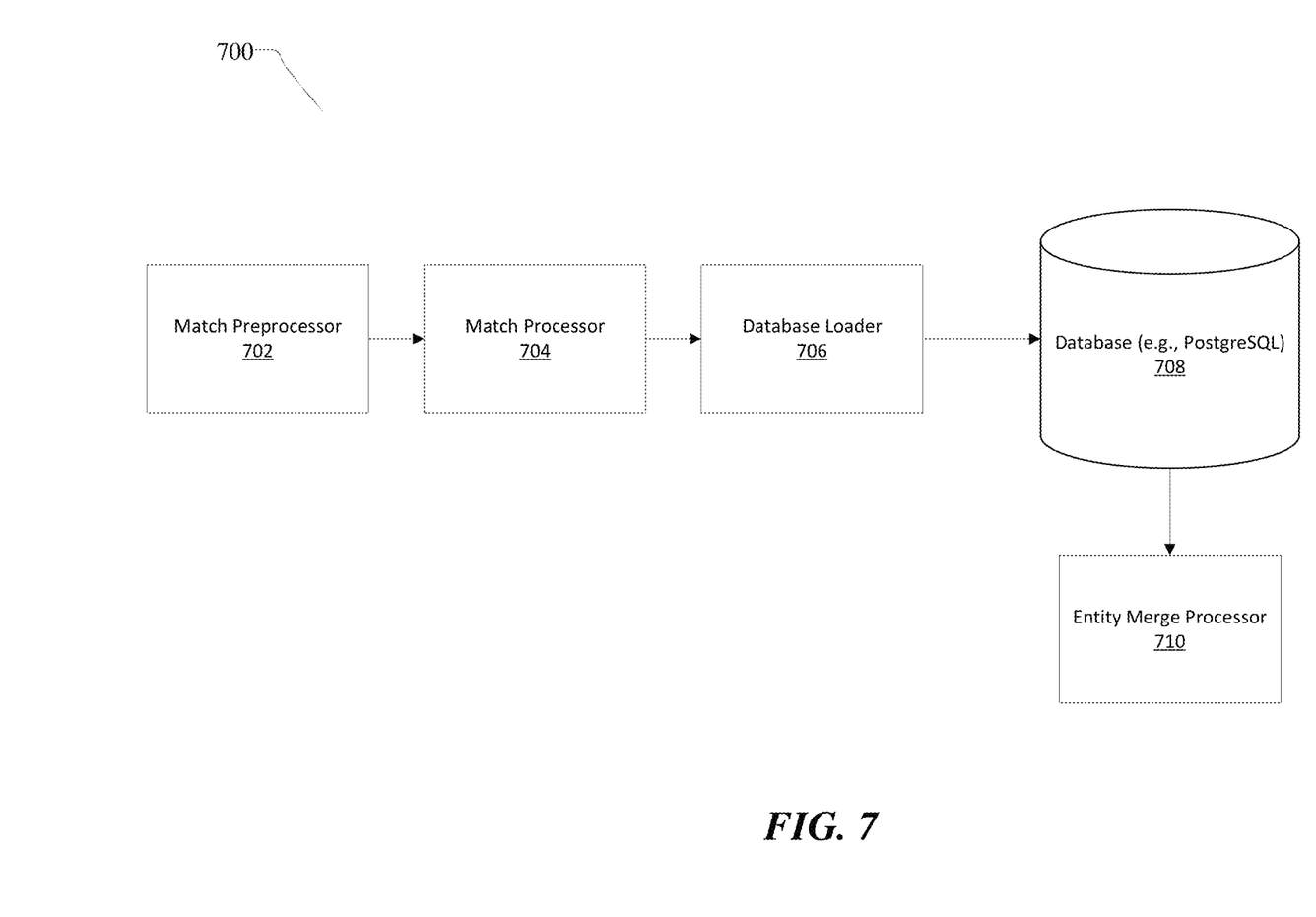
FIG. 7 illustrates an example architecture for performant data matching.

FIG. 7 illustrates an example architecture for performant data matching. Architecture 700 includes match preprocessor 702, match processor 704, database loader 706, database 708, and entity merge processor 710. Match preprocessor 702 is configured to generate partitioned files consisting of hashed (e.g., hashed only token), masked (e.g., hashed and static encryption token), and/or encrypted (e.g., encrypted-only token) tokens. These tokens are then transmitted to the match processor 704, where the partitioned token files are used to generate intermediate files during the matching process. These intermediate files are suitable to be consumed by a database loading process, where the files represent matched results of a single source containing entities, sets, and records. For instance, a client may upload tokenized records from a single data source, and the match processor may identify overlapping tokenized records and consolidate these tokenized records (e.g., a tokenized composite).

The matched tokens may then be transmitted to a database loader 706, where the database loader consumes database-ready matched source files. The database loaders may be bulk database loaders, JDBC database loaders, and other similar types of database loaders. The database loaders then transmit the database-ready files to a database 708, such as a PostgreSQL database, where the tokens are persisted across multiple sources of data.

An entity merge processor 710 may call the database 708 and begin matching tokenized entities with each other to create token sets. The entity merge processor 710 may be configured with a recursive database function to match aggregated tokens at a record level to create record sets.

Figure 8:
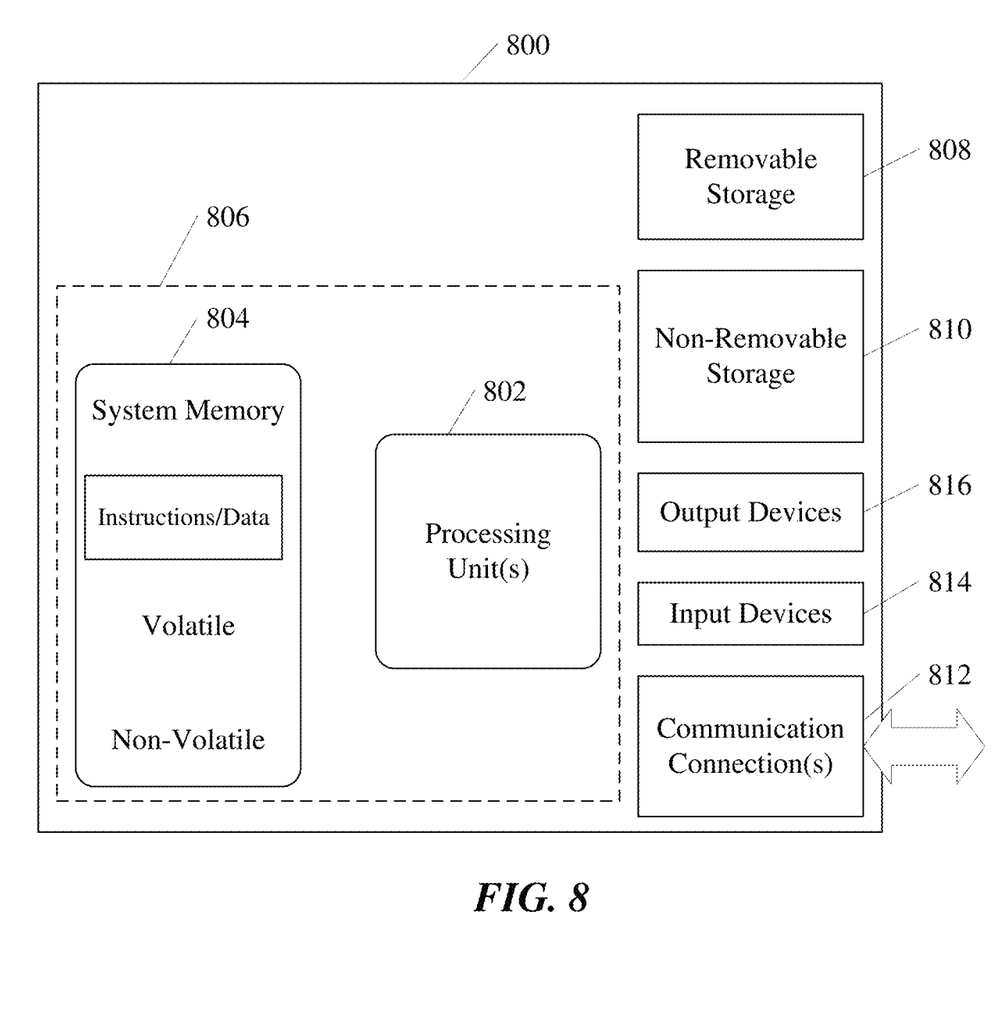
FIG. 8 illustrates one example of a suitable operating environment in which one or more of the present embodiments may be implemented.

FIG. 8 illustrates one example of a suitable operating environment in which one or more of the present embodiments may be implemented. This is only one example of a suitable operating environment and is not intended to suggest any limitation as to the scope of use or functionality. Other well-known computing systems, environments, and/or configurations that may be suitable for use include, but are not limited to, personal computers, server computers, hand-held or laptop devices, multiprocessor systems, microprocessor-based systems, programmable consumer electronics such as smart phones, network PCs, minicomputers, mainframe computers, distributed computing environments that include any of the above systems or devices, and the like.

In its most basic configuration, operating environment 800 typically includes at least one processing unit 802 and memory 804. Depending on the exact configuration and type of computing device, memory 804 (storing, among other things, information related to detected devices, association information, personal gateway settings, and instructions to perform the methods disclosed herein) may be volatile (such as RAM), non-volatile (such as ROM, flash memory, etc.), or some combination of the two. This most basic configuration is illustrated in FIG. 8 by dashed line 806. Further, environment 800 may also include storage devices (removable, 808, and/or non-removable, 810) including, but not limited to, magnetic or optical disks or tape. Similarly, environment 800 may also have input device(s) 814 such as keyboard, mouse, pen, voice input, etc. and/or output device(s) 816 such as a display, speakers, printer, etc. Also included in the environment may be one or more communication connections, 812, such as LAN, WAN, point to point, etc.

Operating environment 800 typically includes at least some form of computer readable media. Computer readable media can be any available media that can be accessed by processing unit 802 or other devices comprising the operating environment. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible medium which can be used to store the desired information. Computer storage media does not include communication media.

Communication media embodies non-transitory computer readable instructions, data structures, program modules, or other data. Computer readable instructions may be transported in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The operating environment 800 may be a single computer operating in a networked environment using logical connections to one or more remote computers. The remote computer may be a personal computer, a server, a router, a network PC, a peer device or other common network node, and typically includes many or all of the elements described above as well as others not so mentioned. The logical connections may include any method supported by available communications media. Such networking environments are commonplace in offices, enterprise-wide computer networks, intranets and the Internet.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

From the foregoing, it will be appreciated that specific embodiments of the invention have been described herein for purposes of illustration, but that various modifications may be made without deviating from the scope of the invention. Accordingly, the invention is not limited except as by the appended claims.

What is claimed is:

1. A method of data matching, the method comprising:
determining, by simple weighting, that at least one token record from a first source and at least one token record from a second source satisfy at least one token set rule, wherein the at least one token set rule is based on a presence of at least one common token;
generating a token set by merging the at least one token record from the first source with the at least one token record from the second source;
comparing the token set to at least one token record from a third source; and
retokenizing, by at least one hashing roll-up function, the at least one token record from the third source into the token set.

2. The method of claim 1, further comprising:
identifying at least one overlapping token record in the third source based on the at least one hashing roll-up function.

3. The method of claim 1, further comprising:
identifying at least one duplicate token record in the third source based on the at least one hashing roll-up function.

4. The method of claim 1, further comprising:
comparing the token set to at least one universal reference token repository;
determining that the token set is not present in the at least one universal reference token repository; and
in response to determining that the token set is not present in the at least one universal reference token repository, storing the token set in the at least one universal reference token repository, wherein the at least one universal reference token repository is comprised of a plurality of token records from at least one of: a customer source or a reference source.

5. The method of claim 1, further comprising:
merging, using the at least one hashing roll-up function, the at least one token record from the third source with the token set.

6. The method of claim 1, wherein the at least one token set rule is comprised of at least two token requirements, wherein one of the at least two token requirements is the at least one common token.

7. The method of claim 1, wherein the token set is comprised of a plurality of token records, wherein each of the plurality of token records comprise the at least one common token.

8. A system comprising:
one or more processors; and
one or more memories storing instructions that, when executed by the one or more processors, cause the system to perform a process of data matching, the process comprising:
determining, by simple weighting, that at least one token record from a first source and at least one token record from a second source satisfy at least one token set rule, wherein the at least one token set rule is based on a presence of at least one common token;
generating a token set by merging the at least one token record from the first source with the at least one token record from the second source;
comparing the token set to at least one token record from a third source; and
retokenizing, by at least one hashing roll-up function, the at least one token record from the third source into the token set.

9. The system according to claim 8, wherein the process further comprises:
identifying at least one overlapping token record in the third source based on the at least one hashing roll-up function.

10. The system according to claim 8, wherein the process further comprises:
identifying at least one duplicate token record in the third source based on the at least one hashing roll-up function.

11. The system according to claim 8, wherein the process further comprises:
comparing the token set to at least one universal reference token repository;
determining that the token set is not present in the at least one universal reference token repository; and
in response to determining that the token set is not present in the at least one universal reference token repository, storing the token set in the at least one universal reference token repository, wherein the at least one universal reference token repository is comprised of a plurality of token records from at least one of: a customer source or a reference source.

12. The system according to claim 8, wherein the process further comprises:
merging, using the at least one hashing roll-up function, the at least one token record from the third source with the token set.

13. The system according to claim 8, wherein the at least one token set rule is comprised of at least two token requirements, wherein one of the at least two token requirements is the at least one common token.

14. The system according to claim 8, wherein the token set is comprised of a plurality of token records, wherein each of the plurality of token records comprise the at least one common token.

15. A non-transitory computer-readable medium storing instructions that, when executed by a computing system, cause the computing system to perform operations of data matching, the operations comprising:
determining, by simple weighting, that at least one token record from a first source and at least one token record from a second source satisfy at least one token set rule, wherein the at least one token set rule is based on a presence of at least one common token;
generating a token set by merging the at least one token record from the first source with the at least one token record from the second source;
comparing the token set to at least one token record from a third source; and
retokenizing, by at least one hashing roll-up function, the at least one token record from the third source into the token set.

16. The non-transitory computer-readable medium of claim 15, wherein the operations further comprise:
identifying at least one overlapping token record in the third source based on the at least one hashing roll-up function.

17. The non-transitory computer-readable medium of claim 15, wherein the operations further comprise:
identifying at least one duplicate token record in the third source based on the at least one hashing roll-up function.

18. The non-transitory computer-readable medium of claim 15, wherein the operations further comprise:
comparing the token set to at least one universal reference token repository;
determining that the token set is not present in the at least one universal reference token repository; and
in response to determining that the token set is not present in the at least one universal reference token repository, storing the token set in the at least one universal reference token repository, wherein the at least one universal reference token repository is comprised of a plurality of token records from at least one of: a customer source or a reference source.

19. The non-transitory computer-readable medium of claim 15, wherein the operations further comprise:
merging, using the at least one hashing roll-up function, the at least one token record from the third source with the token set.

20. The non-transitory computer-readable medium of claim 15,
wherein the at least one token set rule is comprised of at least two token requirements, wherein one of the at least two token requirements is the at least one common token, and
wherein the token set is comprised of a plurality of token records, wherein each of the plurality of token records comprise the at least one common token.

* * * * *